US012632710B2

(12) United States Patent　　(10) Patent No.: US 12,632,710 B2
　Park et al.　　　　　　　　　　　(45) Date of Patent: May 19, 2026

(54) SUPERVISED TRAINING ACCELERATOR FOR TEMPORAL CODING-BASED SPIKING NEURAL NETWORK AND OPERATION METHOD THEREOF

(71) Applicant: Korea University Research and Business Foundation, Seoul (KR)

(72) Inventors: Jongsun Park, Seoul (KR); Sung Hyun Choi, Seoul (KR); Dongwoo Lew, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 370 days.

(21) Appl. No.: 18/099,628

(22) Filed: Jan. 20, 2023

(65) Prior Publication Data

US 2023/0237318 A1　　Jul. 27, 2023

(30) Foreign Application Priority Data

Jan. 24, 2022　　(KR) ........................ 10-2022-0009750
Mar. 10, 2022　　(KR) ........................ 10-2022-0030290

(51) Int. Cl.
　*G06N 3/049*　　　　(2023.01)
　*G06V 10/774*　　　(2022.01)

(52) U.S. Cl.
　CPC ........... G06N 3/049 (2013.01); G06V 10/774 (2022.01)

(58) Field of Classification Search
　CPC ............................ G06N 3/049; G06V 10/774
　See application file for complete search history.

(56) References Cited

U.S. PATENT DOCUMENTS 9,311,609 B2 * 4/2016 Marcheret ................ G06N 7/00
2018/0114114 A1 4/2018 Molchanov et al.
(Continued)

FOREIGN PATENT DOCUMENTS

EP　　　3 340 129 A1　　6/2018
JP　　　6271085 B2　　1/2018
(Continued)

OTHER PUBLICATIONS

Lew, Dongwoo, et al., "Early Image Termination Technique During STDP Training of Spiking Neural Network", 2020 International SoC Design Conference, 2020, (2 Pages in English).
(Continued)

*Primary Examiner* — Manav Seth
(74) *Attorney, Agent, or Firm* — NSIP Law

(57)　　　　　ABSTRACT

Disclosed are a method for accelerating supervised training of a spiking neural network. The method includes measuring first and second membrane potentials for each time step during a training process, extracting distribution data of the first and second membrane potentials based on the first and second membrane potentials for the each time step, calculating a threshold value to be used in a subsequent training process based on the distribution data of the first and second membrane potentials, classifying images having no training contribution based on the threshold value calculated in a previous training process, and terminating the training at the time step based on determining that the image does not have the training contribution when a difference between the first and second membrane potentials in the time step is greater than the threshold value.

13 Claims, 7 Drawing Sheets

(56)  References Cited

U.S. PATENT DOCUMENTS

| | | | |
|---|---|---|---|
| 2020/0143229 A1 | 5/2020 | Van Der Made et al. | |
| 2022/0058480 A1* | 2/2022 | Park | G06N 3/049 |
| 2023/0244918 A1* | 8/2023 | Sakemi | G06N 3/04 |
| | | | 706/15 |
| 2023/0385617 A1* | 11/2023 | Ulameen Sheik | G06N 3/049 |

FOREIGN PATENT DOCUMENTS

| | | | | |
|---|---|---|---|---|
| KR | 20200098308 A | * | 8/2020 | G06N 3/045 |
| WO | WO-2020241356 A1 | * | 12/2020 | G06N 3/049 |

OTHER PUBLICATIONS

Korean Office Action Issued on Mar. 13, 2025, in Counterpart Korean Patent Application No. 10-2022-0030290 (7 Pages in English, 7 Pages in Korean).

* cited by examiner

FIG. 5

(a) 1st timestep (b) 2nd timestep (c) 3rd timestep (d) 4th timestep

FIG. 6

SUPERVISED TRAINING ACCELERATOR FOR TEMPORAL CODING-BASED SPIKING NEURAL NETWORK AND OPERATION METHOD THEREOF

CROSS-REFERENCE TO RELATED APPLICATIONS

This application claims priority under 35 U.S.C. § 119 to Korean Patent Applications No. 10-2022-0030290 filed on Mar. 10, 2022 and No. 10-2022-0009750 filed on Jan. 24, 2022, in the Korean Intellectual Property Office, the disclosures of which are incorporated by reference herein in their entireties.

BACKGROUND

Embodiments of the present disclosure relate to a supervised training accelerator of a spiking neural network based on a temporal coding and an operation method thereof.

Spiking neural networks receive and transfer information in spike units of '0' and '1', so they have the advantage of low power consumption in hardware implementation. In addition, as the number of spikes in an inference process decreases with the introduction of temporal coding, the energy of the inference process is greatly reduced. However, training in the neural networks has issues in that energy consumption and training time are very large as the training process including inference, backpropagation, and weight update is repeated with respect to a very large number of training images.

SUMMARY

Embodiments of the present disclosure provide an apparatus and a method for accelerating supervised training of a spiking neural network that can reduce training energy and time by determining the network contribution of a training image and early terminating training of images having no the training contribution.

According to an embodiment of the present disclosure, a method of accelerating supervised training of a spiking neural network includes a membrane potential measuring operation of measuring first and second membrane potentials for each time step during a current training process, a distribution data extraction operation of extracting distribution data of the first and second membrane potentials based on the first and second membrane potentials for the each time step, a threshold value calculation operation of calculating a threshold value to be used in a subsequent training process based on the distribution data of the first and second membrane potentials, an image classification operation of classifying images having no training contribution based on the threshold value calculated in a previous training process, and when a difference between the first and second membrane potentials in the time step is greater than the threshold value, an early training termination operation of determining that the image does not have the training contribution and terminating the training at the time step.

According to an embodiment, the first membrane potential may be the membrane potential of a correct answer neuron, and the second membrane potential may be a largest membrane potential among membrane potentials excluding membrane potentials of the correct answer neuron among a plurality of membrane potentials.

According to an embodiment, the threshold value calculation operation may calculate the threshold value based on Equation 1, Equation 1 may be $a=m+2\sigma$, and where, 'a' may be the threshold value, 'm' may be an average of a membrane potential difference distribution of images with the training contribution, and '$\sigma$' may be a deviation of the membrane potential difference distribution of the images with the training contribution.

According to an embodiment, the image classification operation may set a boundary between the image having no the training contribution and the image having the training contribution based on Equation 2, Equation 2 may be $y=x-a$, and where, 'a' may be the threshold value calculated in the previous training process, 'x' may be the membrane potential of the correct answer neuron, and 'y' may be the largest membrane potential among membrane potentials excluding membrane potentials of the correct answer neuron among the plurality of membrane potentials.

According to an embodiment, the training early termination operation may determine images having no the training contribution based on Equation 3 modified from Equation 2, Equation 3 may be $x-y\geq a$, and where, 'a' may be the threshold value calculated in the previous training process, 'x' may be the membrane potential of the correct answer neuron, and 'y' may be the largest membrane potential among membrane potentials excluding membrane potentials of the correct answer neuron among the plurality of membrane potentials.

According to an embodiment, when Equation 3 is satisfied by substituting the first and second membrane potentials and the threshold value for each time step into Equation 3, the training early termination operation may determine that the image has no the training contribution and may terminate the training at the time step, and, when Equation 3 is not satisfied by substituting the first and second membrane potentials and the threshold value for each time step into Equation 3, the training early termination operation may determine that the image has the training contribution and may proceed with training.

According to an embodiment, the time step may include first to eighth time steps.

According to an embodiment of the present disclosure, a supervised training accelerator for a spiking neural network includes an input layer module into which an input spike signal of the spiking neural network is input, a hidden layer module that receives the input spike signal, an output layer module that receives the input spike signal from the hidden layer module, determines an image having no training contribution, and calculates a threshold value for determining presence or absence of the training contribution, and a global controller that terminates a training process based on the presence or absence of the training contribution determined by the output layer module.

According to an embodiment, the hidden layer module may include a membrane potential update module that receives the input spike signal from the input layer module and calculates membrane potentials of a plurality of neurons based on input spikes, a weight update module that adds weights of the input spikes to the membrane potential based on an input of the input spike signal, a membrane potential buffer that stores the membrane potentials of the plurality of neurons, and a spike time buffer that stores spike occurrence times of the plurality of neurons.

According to an embodiment, the output layer module may include a spike buffer that receives the input spike signal from the hidden layer module, a membrane potential update module that receives the input spike signal from the spike buffer and calculates membrane potentials of a plurality of neurons based on input spikes, a weight update module that adds weights of the input spikes to the membrane potential based on an input of the input spike signal, a membrane potential buffer that stores the membrane potentials of the plurality of neurons, a spike time buffer that stores spike occurrence times of the plurality of neurons, an error calculation unit that calculates a difference between a spike occurrence time of the plurality of neurons after a forward propagation process is finished during a training process and a target correct answer signal, an early determination unit that determines an image having no the training contribution when calculation of each time step in the forward propagation process is completed, and a threshold calculation unit that calculates a threshold value to be used in a subsequent training after the forward propagation process is completed.

According to an embodiment, when a difference between the first and second membrane potentials in the time step is greater than the threshold value, the early determination unit may determine that the image does not have the training contribution and may terminate the training at the time step.

According to an embodiment, the threshold value calculation unit may calculate the threshold value to be used in a subsequent training process based on distribution data of first and second membrane potentials among the membrane potentials of the plurality of neurons.

According to an embodiment, the first membrane potential may be a membrane potential of a correct answer neuron, and the second membrane potential may be a largest membrane potential among membrane potentials excluding membrane potentials of the correct answer neuron among a plurality of membrane potentials.

BRIEF DESCRIPTION OF THE FIGURES

The above and other objects and features of the present disclosure will become apparent by describing in detail embodiments thereof with reference to the accompanying drawings.

FIG. 5 is a diagram illustrating a method of early terminating training by determining an image having no training contribution, according to an embodiment of the present disclosure.

FIG. 6 is a diagram illustrating a supervised training accelerator for a spiking neural network, according to an embodiment of the present disclosure.

DETAILED DESCRIPTION

Hereinafter, embodiments of the present disclosure will be described with reference to the accompanying drawings so as to describe the technical idea of the present disclosure in detail to such an extent that those skilled in the art can easily implement the present disclosure.

Figure 1:
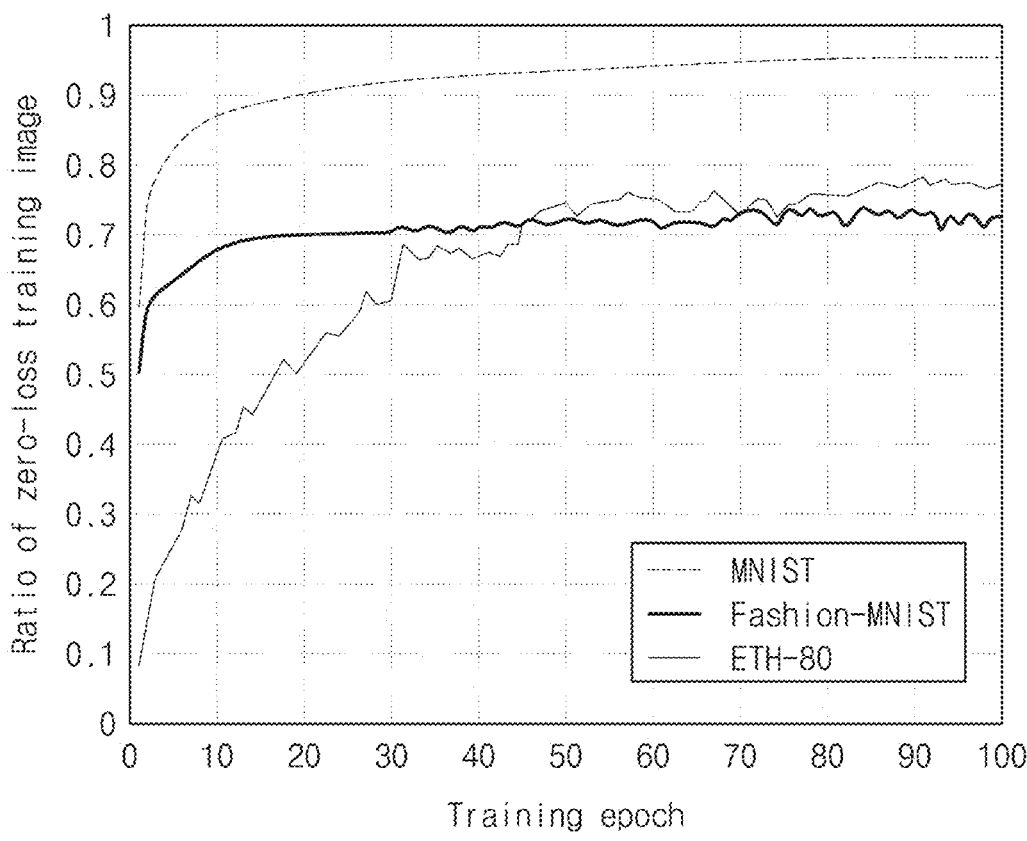
FIG. 1 is a graph illustrating a ratio of images having no training contribution according to a training process.

FIG. 1 is a graph illustrating a ratio of images with no training contribution according to a training process.

Referring to FIG. 1, it is possible to measure a ratio of images having no training contribution according to the training process using a plurality of datasets. In this case, an x-axis may represent a training process, and a y-axis may represent a ratio of images that do not contribute to training among training data for each of a plurality of datasets. The plurality of datasets may be one of MNIST, Fashion-MNIST, and ETH-80.

In the case of the MNIST dataset, when the size of the training set is 60000 and the ratio of images having no the training contribution according to the training process is 0.5, there may be 30000 images having no the training contribution.

In the case of the Fashion-MNIST dataset, when the size of the training set is 60000 and the ratio of images having no the training contribution according to the training process is 0.5, there may be 30000 images having no the training contribution.

In the case of the ETH-80 dataset, there are a total of 3280 images. For example, 2624 images, which are 80% of the total images may be used as a training set, and 656 images, which are 20% of the total images may be used as an inference set.

As described above, it can be seen that in the training process of the spiking neural network based on the conventional technology, the ratio of images having no the training contribution is large, and the number of images having no the training contribution further increases as training progresses. As such, when the number of images having no the training contribution increases during the training process, there is a problem in that energy consumption increases and computation time takes a long time.

Figure 2:
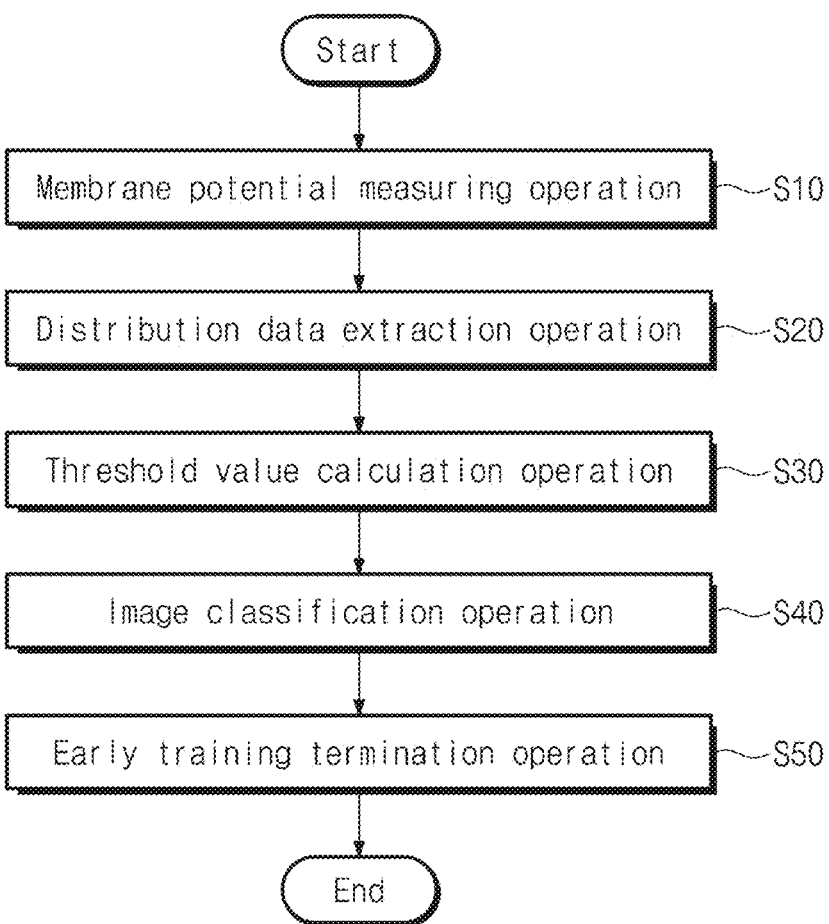
FIG. 2 is a flowchart illustrating a method for accelerating supervised training of a spiking neural network, according to an embodiment of the present disclosure.

FIG. 2 is a flowchart illustrating a method for accelerating supervised training of a spiking neural network, according to an embodiment of the present disclosure.

In operation S10, a supervised training accelerator of the spiking neural network may measure a membrane potential. For example, the supervised training accelerator of the spiking neural network may measure first and second membrane potentials for each time step during a current training process.

In this case, the first membrane potential may be a membrane potential of a correct answer neuron, and the second membrane potential may be a largest membrane potential among membrane potentials excluding membrane potentials of the correct answer neuron among a plurality of membrane potentials.

In operation S20, the supervised training accelerator of the spiking neural network may extract distribution data. For example, the supervised training accelerator of the spiking neural network may extract the distribution data of first and second membrane potentials based on the first and second membrane potentials for each time step. For example, the distribution data may be in the form of at least one of a Gaussian distribution form and a scatter plot form.

In operation S30, the supervised training accelerator of the spiking neural network may calculate a threshold value. For example, the supervised training accelerator of the spiking neural network may calculate a threshold value to be used in a subsequent training process based on the distribution data of current first and second membrane potentials. In this case, the threshold value may be calculated based on Equation 1, and details regarding this will be described later with reference to FIG. 4.

In operation S40, the supervised training accelerator of the spiking neural network may classify images. For example, the supervised training accelerator of the spiking neural network may classify the images into an image having no the training contribution and an image having the training contribution based on the threshold value calculated in a previous training process. For example, the supervised training accelerator of the spiking neural network may set a boundary between an image having no the training contribution and an image having the training contribution.

In operation S50, the supervised training accelerator of the spiking neural network may terminate training early. For example, the supervised training accelerator of the spiking neural network may determine that the image has no the training contribution when a difference between the first and second membrane potentials in the time step is greater than the threshold value, and may terminate the training at the corresponding time step.

As described above, the supervised training accelerator of the spiking neural network may early terminate training of an image having no the training contribution based on the first and second membrane potentials in the current training process and the threshold value in the previous training process. Accordingly, the supervised training accelerator of the spiking neural network may reduce the amount of computation and computation time without reducing accuracy by terminating training with respect to images that do not contribute to training.

Figure 3A:
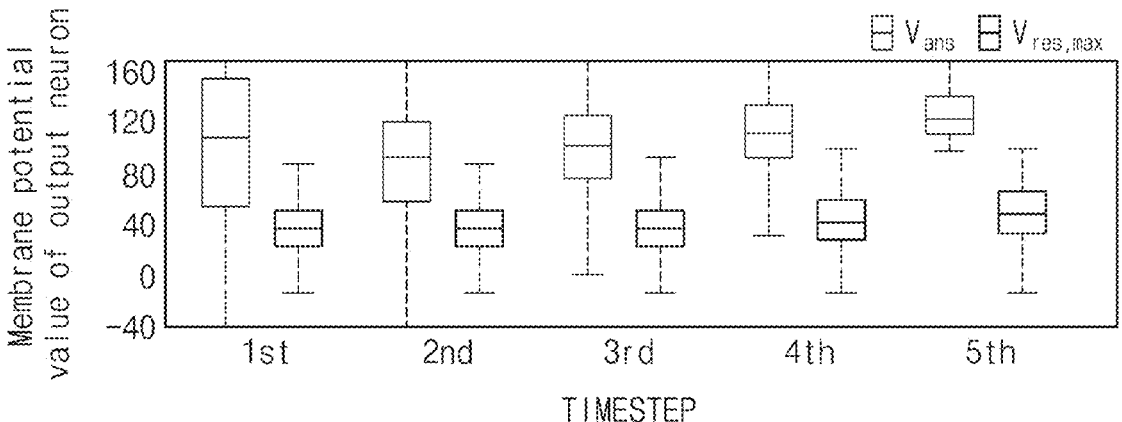
FIGS. 3A and 3B are diagrams illustrating membrane potential values of output neurons according to time steps of a training process.
Figure 3B:
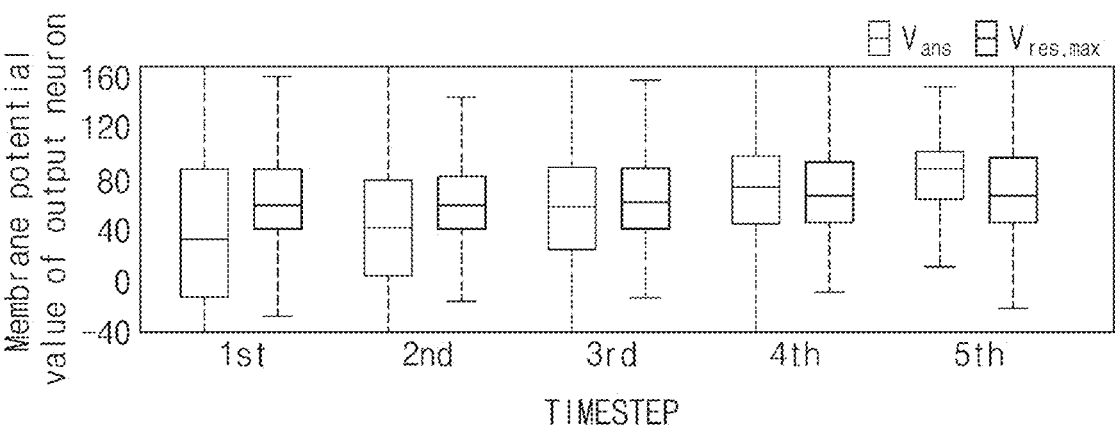

FIGS. 3A and 3B are diagrams illustrating membrane potential values of output neurons according to time steps of a training process. The time steps may include first to eighth time steps, and the first to fifth time steps will be described below for convenience of description.

FIG. 3A is a diagram illustrating a comparison between a first membrane potential and a second membrane potential during the training process of an image having no the training contribution.

Referring to FIG. 3A, in the case of an image having no the training contribution, it may be seen that a difference between a first membrane potential (Vans), which is the membrane potential of the correct neuron, and the second membrane potential (Vres, max), which is the maximum membrane potential among the membrane potentials of the remaining neurons excluding the membrane potentials of the correct neurons, is increased according to the time step.

In more detail, in the case of images having no the training contribution, it may be seen that a difference between the first membrane potential and the second membrane potential appears larger in the second time step than in the first time step. It may be seen that the difference between the first membrane potential and the second membrane potential appears larger in the fifth time step than in the second time step. That is, in the case of images with no contribution, as learning progresses, the distribution of the first membrane potentials appears as a larger value than the distribution of the second membrane potentials.

Referring to FIG. 3B, in the case of an image having the training contribution, it may be seen that there was almost no difference between a first membrane potential (Vans), which is the membrane potential of the correct neuron, and the second membrane potential (Vres, max), which is the maximum membrane potential among the membrane potentials of the remaining neurons excluding the membrane potentials of the correct neurons according to the time step.

In more detail, in the case of images having the training contribution, it may be seen that there was no difference between the first and second membrane potentials in the first to fifth time steps. That is, in the case of the images having the training contribution, the values of the first membrane potential and the second membrane potential have almost the same distribution.

As described above, an image having no the training contribution may be classified based on the difference between the first membrane potential and the second membrane potential.

Figure 4:
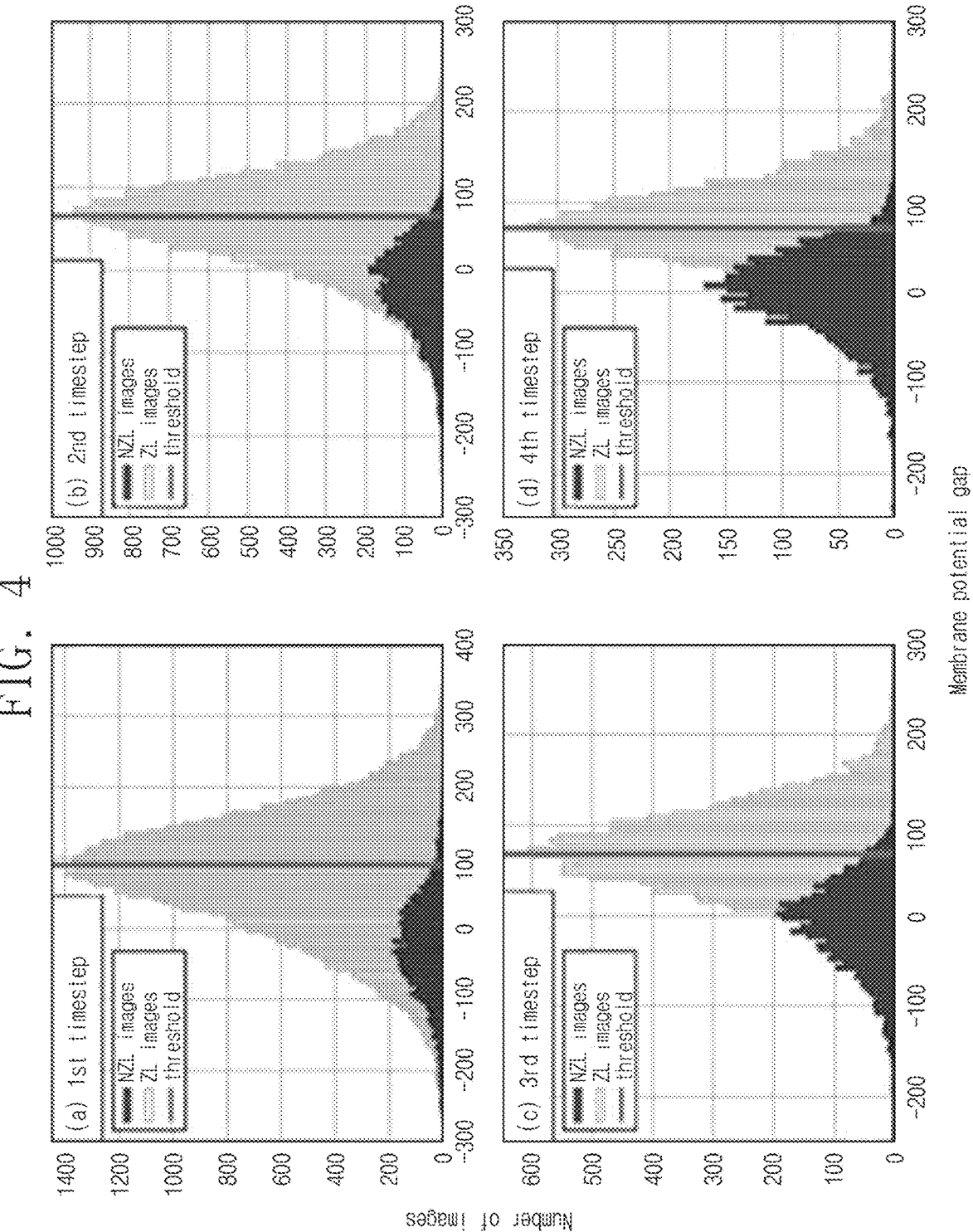
FIG. 4 is a diagram illustrating a method of calculating a threshold value, according to an embodiment of the present disclosure.

FIG. 4 is a diagram illustrating a method of calculating a threshold value, according to an embodiment of the present disclosure.

Referring to FIG. 4, the supervised training accelerator of the spiking neural network may represent images (NZL images) having the training contribution and images (ZL images) having no the training contribution in Gaussian form during the training process.

For example, the supervised training accelerator of the spiking neural network may represent images (NZL images) having the training contribution and images (ZL images) having no the training contribution in the Gaussian form in which the x-axis is a gap of the membrane potential and the y-axis is the number of images having the corresponding membrane potential gap.

The supervised training accelerator of the spiking neural network may calculate the threshold value based on data expressed in the Gaussian form, that is, based on the membrane potential gap and the number of images having the corresponding membrane potential gap according to a time step. In this case, the membrane potential gap may be a difference between the membrane potential of the correct neuron and the maximum membrane potential of the membrane potentials of the remaining neurons.

The threshold value may be calculated based on Equation 1. Equation 1 is as follows.

$$a = m = 2\sigma \qquad \text{[Equation 1]}$$

In this case, 'a' may be the threshold value, 'm' may be an average of a membrane potential difference distribution of images with the training contribution, and 'σ' may be a deviation of the membrane potential difference distribution of the images with the training contribution.

As the threshold value is calculated for each time step and training process without being found empirically, it may be automatically calculated regardless of a data net and network.

Figure 5:
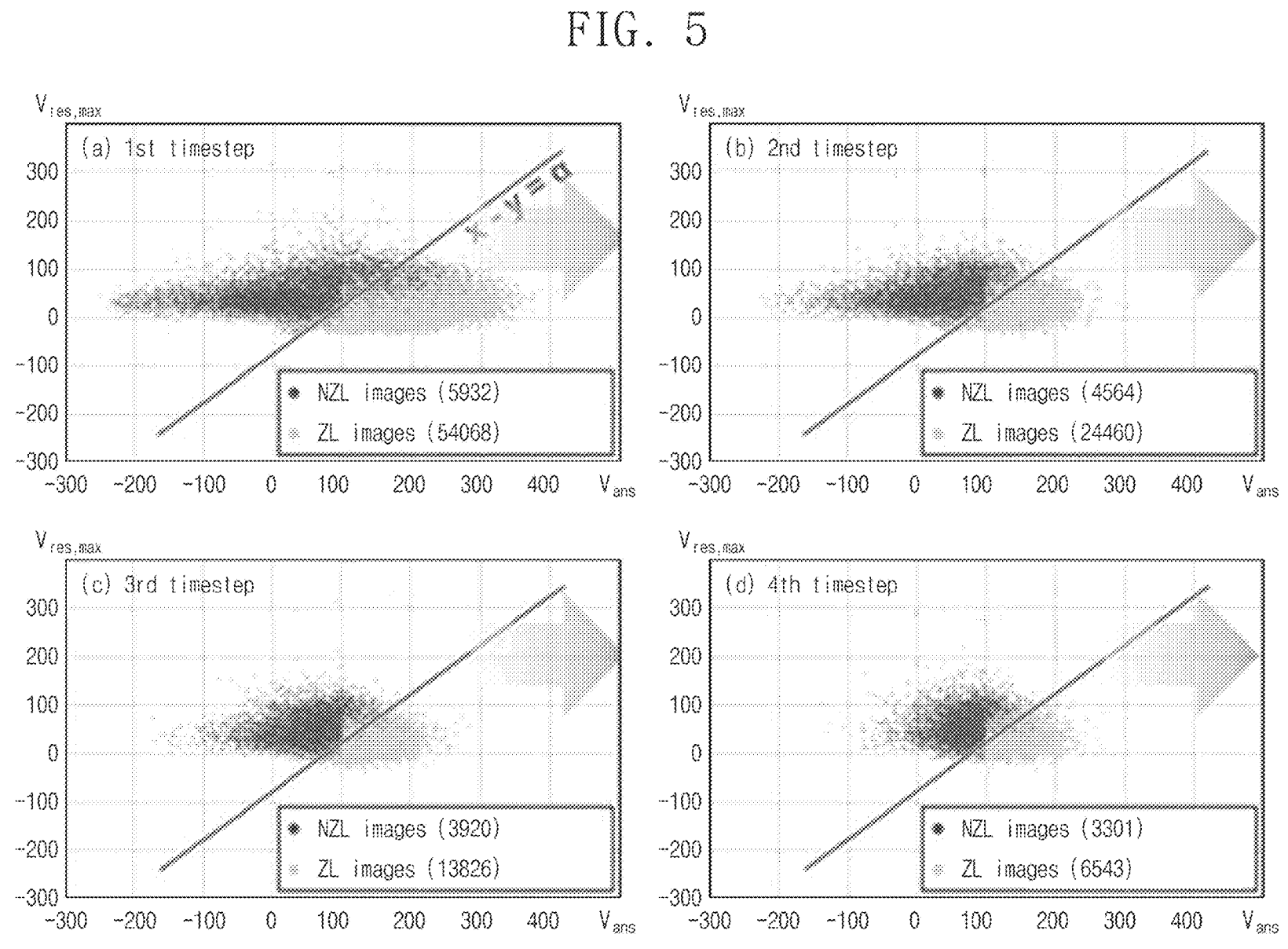

FIG. 5 is a diagram illustrating a method of early terminating training by determining an image having no training contribution, according to an embodiment of the present disclosure.

Referring to FIG. 5, the supervised training accelerator of the spiking neural network may represent the distribution of images having no the training contribution and the distribution of images having the training contribution in the form of a scatter plot in which the x-axis is the membrane potential (Vans) of the correct neuron and the y-axis is the membrane potential (Vres, max) of the maximum value among the membrane potentials of neurons excluding the correct neuron.

The supervised training accelerator of the spiking neural network may determine a relationship between the first and second membrane potentials in training images for the number of times of one training in the training process according to the time step, based on the data represented in the form of the scatter plot.

The supervised training accelerator of the spiking neural network may set a boundary between an image having no the training contribution and an image having the training contribution based on Equation 2.

Equation 2 may be y=x–a.

Here, 'a' may be the threshold value calculated in the previous training process, 'x' may be a first membrane potential which is the membrane potential of the correct answer neuron, and 'y' may be a second membrane potential which is the largest membrane potential among membrane potentials excluding membrane potentials of the correct answer neuron among the plurality of membrane potentials.

The supervised training accelerator of the spiking neural network may terminate training with respect to an image having no the training contribution based on Equation 3 generated by modifying Equation 2.

Equation 3 may be x–y≥a.

In this case, 'a' may be the threshold value calculated in the previous training process, 'x' may be the first membrane potential which is the membrane potential of the correct answer neuron, and 'y' may be the second membrane potential which is the largest membrane potential among membrane potentials excluding membrane potentials of the correct answer neuron among the plurality of membrane potentials.

When Equation 3 is satisfied, the supervised training accelerator of the spiking neural network may determine that the image has no the training contribution and may terminate the ongoing training. In contrast, when Equation 3 is not satisfied, the supervised training accelerator of the spiking neural network may determine that the image has the training contribution and may proceed with training.

That is, when a difference between the first membrane potential and the second membrane potential is greater than the threshold value (the right side of a line), the supervised training accelerator of the spiking neural network may determine that there is no training contribution of the image and may terminate training.

Figure 6:
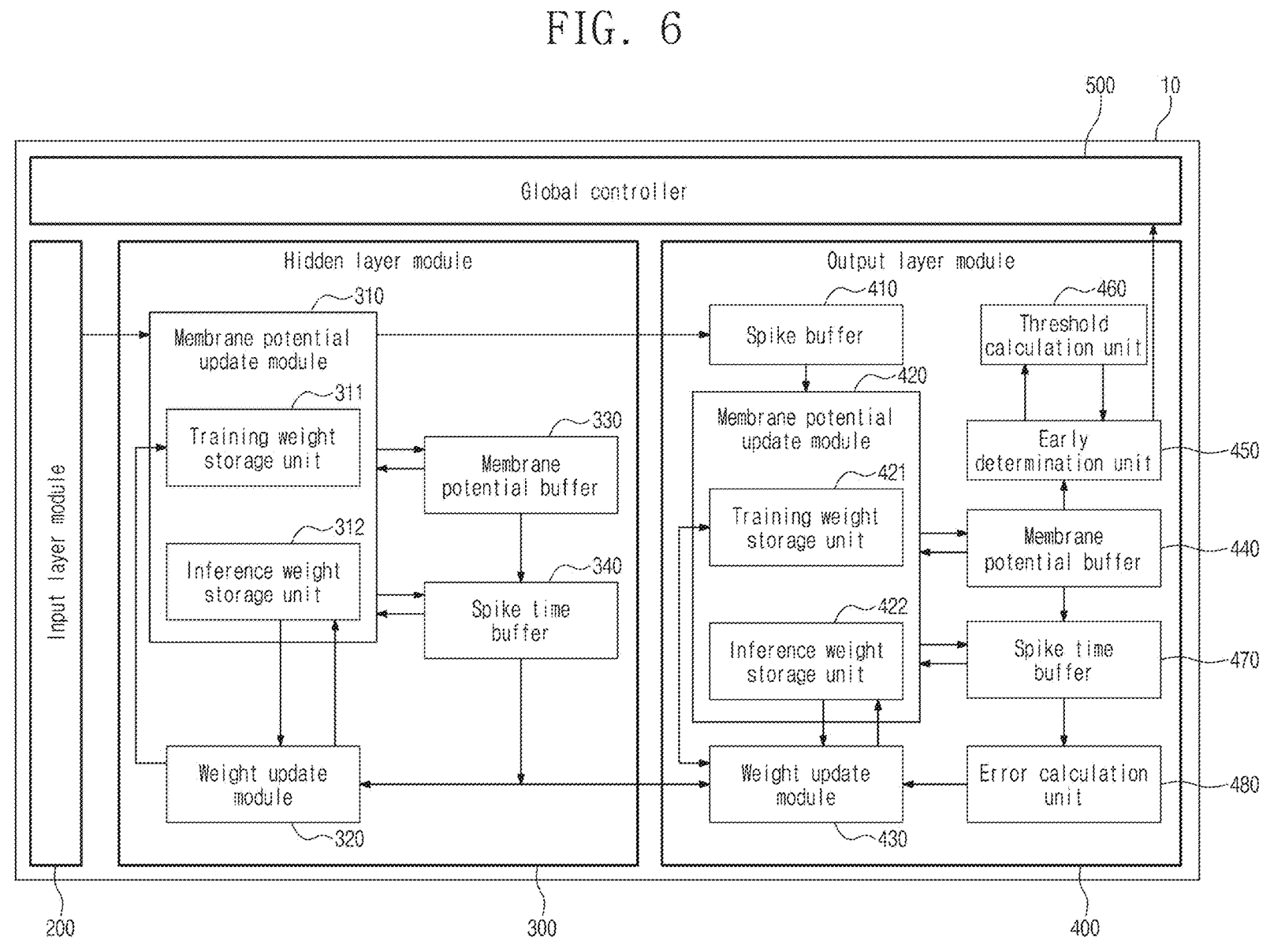

FIG. 6 is a diagram illustrating a supervised training accelerator for a spiking neural network, according to an embodiment of the present disclosure.

Referring to FIG. 6, the supervised training accelerator 10 of the spiking neural network may include an input layer module 200, a hidden layer module 300, an output layer module 400, and a global controller 500.

The input layer module 200 may receive an input spike signal of a spiking neural network.

The hidden layer module 300 may receive the input spike signal from the input layer module 200. In this case, the hidden layer module 300 may include a membrane potential update module 310, a weight update module 320, a membrane potential buffer 330, and a spike time buffer 340.

The membrane potential update module 310 may receive the input spike signal from the input layer module 200 and may calculate membrane potentials of a plurality of neurons based on input spikes.

The membrane potential update module 310 may include a training weight storage unit 311 and an inference weight storage unit 312.

The training weight storage unit 311 may update the membrane potential by receiving weights from the weight update module 320 during the training process.

The inference weight storage unit 312 may update the membrane potential by receiving weights from the weight update module 320 during the inference process.

The weight update module 320 may add weights of the input spikes to the membrane potential based on the input of the input spike signal. The weight update module 320 may transmit weight information to the training weight storage unit 311 and the inference weight storage unit 312. Also, the weight update module 320 may transmit the weight information to a weight update module 430 of the output layer module 400.

The membrane potential buffer 330 may store membrane potentials of a plurality of neurons. The membrane potential buffer may transmit or receive a membrane potential value to/from the membrane potential update module 310. Also, the membrane potential buffer 330 may transmit information about the membrane potential to the spike time buffer 340.

The spike time buffer 340 may store spike occurrence times of the plurality of neurons.

The output layer module 400 may receive an input spike signal from the hidden layer module 300, may determine images having no the training contribution, and may calculate a threshold for determining whether the image has the training contribution. In this case, the output layer module 400 may include a spike buffer 410, a membrane potential update module 420, the weight update module 430, a membrane potential buffer 440, an early determination unit 450, a threshold calculation unit 460, a spike time buffer 470, and an error calculation unit 480.

The spike buffer 410 may receive an input spike signal from the membrane potential update module of the hidden layer module 300. The spike buffer 410 may transmit the input spike signal to the membrane potential update module 420.

The membrane potential update module 420 may receive the input spike signal from the input layer module 300 and may calculate membrane potentials of a plurality of neurons based on input spikes.

The membrane potential update module 420 may include a training weight storage unit 421 and an inference weight storage unit 422.

The training weight storage unit 421 may update the membrane potential by receiving weights from the weight update module 430 during the training process.

The inference weight storage unit 422 may update the membrane potential by receiving weights from the weight update module 430 during the inference process.

The weight update module 430 may add weights of the input spikes to the membrane potential based on the input of the input spike signal. The weight update module 430 may transmit weight information to the training weight storage unit 421 and the inference weight storage unit 422. Also, the weight update module 430 may transmit the weight information to the weight update module 320 of the hidden layer module 300.

The membrane potential buffer 440 may store membrane potentials of a plurality of neurons. The membrane potential buffer 440 may transmit or receive a membrane potential value to/from the membrane potential update module 420. In addition, the membrane potential buffer 440 may transmit information about the membrane potential to the spike time buffer 470 and the early determination unit 450.

The early determination unit 450 may determine an image having no the training contribution when calculation of each time step is completed in the forward propagation process. The early determination unit 450 may transmit the determination result to the global controller 500.

For example, when a difference between the first and second membrane potentials in the time step is greater than the threshold value, the early determination unit 450 may determine that the image does not have the training contribution and may terminate the training at the time step. In this case, the first membrane potential may be a membrane potential of a correct answer neuron, and the second membrane potential may be the largest membrane potential among membrane potentials excluding membrane potentials of the correct answer neuron among a plurality of membrane potentials.

The threshold calculator 460 may calculate a threshold to be used in the subsequent training after the forward propagation process is finished. In addition, the threshold calculation unit 460 may transmit the threshold value calculated in the previous training to the early determination unit 450.

The spike time buffer 470 may store spike occurrence times of the plurality of neurons. The spike time buffer 470 may transmit the spike occurrence time to the error calculation unit 480.

The error calculation unit 480 may calculate whether there is an error by calculating a difference between the spike occurrence time of the plurality of neurons after the forward propagation process is finished and the target correct answer signal. The error calculation unit may transmit the calculation result to the weight update module 430.

The global controller 500 may terminate the training process based on whether or not there is the training contribution determined by the early determination unit 450 of the output layer module 400. For example, when the early determination unit 450 determines that the image has no the training contribution, the global controller 500 may terminate the training process.

According to an embodiment of the present disclosure, the apparatus and the method for accelerating supervised training of a spiking neural network may reduce training energy and time by determining the network contribution of a training image and by early terminating image training having no the training contribution.

The embodiments disclosed in this specification and drawings are only presented as specific examples to easily describe the content of the present disclosure and help understanding, and are not intended to limit the scope of the present disclosure. Accordingly, the scope of the present disclosure should be construed as including all changes or modified forms derived based on the technical spirit of the present disclosure in addition to the embodiments disclosed herein.

What is claimed is:

1. A method of accelerating supervised training of a spiking neural network, the method comprising:
   a membrane potential measuring operation of measuring first and second membrane potentials for each time step during a current training process;
   a distribution data extraction operation of extracting distribution data of the first and second membrane potentials based on the first and second membrane potentials for the each time step;
   a threshold value calculation operation of calculating a threshold value to be used in a subsequent training process based on the distribution data of the first and second membrane potentials;
   an image classification operation of classifying images having no training contribution based on the threshold value calculated in a previous training process; and
   when a difference between the first and second membrane potentials in the time step is greater than the threshold value, an early training termination operation of determining that the image does not have the training contribution and terminating the training at the time step.

2. The method of claim 1, wherein the first membrane potential is a membrane potential of a correct answer neuron, and the second membrane potential is a largest membrane potential among membrane potentials excluding membrane potentials of the correct answer neuron among a plurality of membrane potentials.

3. The method of claim 2, wherein the threshold value calculation operation calculates the threshold value based on Equation 1, Equation 1 is $a=m+2\sigma$, and
   where, 'a' is the threshold value, 'm' is an average of a membrane potential difference distribution of images with the training contribution, and '$\sigma$' is a deviation of the membrane potential difference distribution of the images with the training contribution.

4. The method of claim 2, wherein the image classification operation sets a boundary between the image having no the training contribution and the image with the training contribution based on Equation 2, Equation 2 is $y=x-a$, and
   where, 'a' is the threshold value calculated in the previous training process, 'x' is the membrane potential of the correct answer neuron, and 'y' is the largest membrane potential among membrane potentials excluding membrane potentials of the correct answer neuron among the plurality of membrane potentials.

5. The method of claim 4, wherein the training early termination operation determines images having no the training contribution based on Equation 3 modified from Equation 2, Equation 3 is $x-y\geq a$, and where, 'a' is the threshold value calculated in the previous training process, 'x' is the membrane potential of the correct answer neuron, and 'y' is the largest membrane potential among membrane potentials excluding membrane potentials of the correct answer neuron among the plurality of membrane potentials.

6. The method of claim 5, wherein, when Equation 3 is satisfied by substituting the first and second membrane potentials and the threshold value for each time step into Equation 3, the training early termination operation determines that the image has no the training contribution and terminates the training at the time step, and
   when Equation 3 is not satisfied by substituting the first and second membrane potentials and the threshold value for each time step into Equation 3, the training early termination operation determines that the image has the training contribution and proceeds with training.

7. The method of claim 1, wherein the time step includes first to eighth time steps.

8. A supervised training accelerator for a spiking neural network, comprising:
   a processor and an input interface configured to receive an input spike signal of the spiking neural network;
   a processor configured to update membrane potentials of a plurality of neurons based on the input spike signal and to store the membrane potentials in a membrane potential memory, the processor further configured to store spike occurrence times of the plurality of neurons in a time-recording memory;
   a processor configured to determine whether an image has a training contribution by comparing a difference between a first membrane potential and a second membrane potential with a threshold value, and to calculate the threshold value for determining presence or absence of the training contribution based on the membrane potentials; and
   a processor configured to terminate a training process when it is determined that the image has no training contribution.

9. The supervised training accelerator of claim 8, wherein the processor configured to update membrane potentials is further configured to:

calculate the membrane potentials of the plurality of neurons by performing weighted-sum operations on the input spike signal;

store the membrane potentials of the plurality of neurons in the membrane potential memory; and store spike occurrence times of the plurality of neurons in the time-recording memory.

10. The supervised training accelerator of claim 8, wherein the processor configured to update membrane potentials is further configured to:

store the input spike signal received from the input interface in a spike-signal memory;

calculate the membrane potentials of the plurality of neurons based on the stored spike signal;

add weights of the stored spike signal to the membrane potentials;

store the membrane potentials of the plurality of neurons in the membrane potential memory;

store spike occurrence times of the plurality of neurons in the time-recording memory;

calculate a difference between a spike occurrence time of the plurality of neurons after a forward propagation process is finished and a target correct answer signal;

determine that an image has no training contribution by comparing the first and second membrane potentials with the threshold value when a calculation of each time step of the forward propagation process is completed; and calculate the threshold value to be used in a subsequent training process after the forward propagation process is finished.

11. The supervised training accelerator of claim 10, wherein the processor configured to terminate a training process is further configured to terminate a training process when it is determined that the image has no training contribution.

12. The supervised training accelerator of claim 10, wherein the processor configured to determine whether an image has a training contribution is further configured to determine whether the image has a training contribution by comparing a difference between the first and second membrane potentials with the threshold value.

13. The supervised training accelerator of claim 12, wherein the first membrane potential is a membrane potential of a correct answer neuron, and the second membrane potential is a largest membrane potential among membrane potentials excluding membrane potentials of the correct answer neuron among the plurality of membrane potentials.

* * * * *